UNITED STATES PATENT OFFICE.

HARRY P. BASSETT, OF BALTIMORE, MARYLAND, ASSIGNOR TO THE SPAR CHEMICAL COMPANY, OF BALTIMORE, MARYLAND, A CORPORATION OF MARYLAND.

PROCESS OF SEPARATING SODIUM AND POTASSIUM SALTS.

1,091,033.   Specification of Letters Patent.   Patented Mar. 24, 1914.

No Drawing.   Application filed September 7, 1911.  Serial No. 648,008.

*To all whom it may concern:*

Be it known that I, HARRY P. BASSETT, a citizen of the United States, residing at Baltimore, State of Maryland, have invented certain new and useful Improvements in Processes of Separating Sodium and Potassium Salts, of which the following is a specification.

This invention relates to the separation of potassium and sodium salts and has particular reference to a novel process of economically and readily separating potassium from sodium in a solution in which the potassium and sodium are present in the form of sulfates.

The process has particular adaptability to the separation of potassium in a process of recovering potassium from feldspar hereinafter set forth, but is adapted for use wherever potassium is to be separated from sodium where the said metals exist in the form of sulfates and it is to be understood that the invention is not specifically restricted to the recovery of potassium in feldspar treatment.

Heretofore great difficulty has been encountered in the separation of potassium from sodium where the metals exist in the form of sulfates. Now I have discovered that if sodium chlorid is added to a solution of potassium sulfate and sodium sulfate and the solution maintained at an elevated temperature the potassium can be recovered readily and economically by merely withdrawing the sodium sulfate crystals as formed and that the process can be carried on continuously, the solution under treatment being added to the crystallizing tank as the solution becomes weak in sodium salt, and the sodium sulfate, in crystalline form, withdrawn either continuously or intermittently as the crystals form.

In my process of recovering potash from feldspar in which my new separation treatment is advantageously employed I preferably grind feldspar to a degree of fineness which will permit it to pass through a 40 to 60 mesh sieve. I then mix therewith sodium acid sulfate and sodium chlorid in approximately the following proportions: feldspar 5 parts by weight, sodium acid sulfate 5 parts by weight, sodium chlorid 1.8 parts by weight. The mixture is heated to preferably about 700° C. and the fused mass dumped while hot into water until the solution of the salts is approximately concentrated. The solution is separated by decantation or otherwise from the insoluble residue and there is then added to the solution, sodium chlorid in the equivalent proportion of approximately two parts of sodium chlorid to one part of the potassium sulfate present in the solution. The solution is then placed in a crystallizing tank where it is heated to preferably from 60° to 107° C., the best results being obtained at approximately 100° C. Crystals of sodium sulfate form rapidly in the crystallizing tank and these may be withdrawn by suitable rakes or otherwise as formed, the solution, previously treated with sodium chlorid being added as the solution becomes depleted of the sodium salts.

The withdrawn sodium sulfate is in practice, raked from the crystallizing tank into a second tank containing concentrated sodium sulfate solution in water, which solution is preferably maintained at the same temperature as the solution in the first tank and from this second tank the purified sodium sulfate crystals are raked as formed. Where it is desired to obtain the sodium sulfate crystals in very pure form I employ a third tank containing concentrated sodium sulfate solution and into this the crystals of sodium sulfate are raked from the second crystallizing tank. This third tank is maintained at the same temperature as the first tank. The crystals after passing through the third tank are almost entirely free from contamination by other salts and are practically chemically pure. After the crystallization has been carried on in the first tank for a few hours, the contents of this tank, which have gradually become richer in potassium salt, will contain a content of potassium chlorid which is approximately 80 per cent. by weight of the salt present in such tank. This residue is drawn off and evaporated to dryness and is then ready for use or sale, 80 per cent. potassium chlorid being standard in the fertilizer and powder industries.

I have found that some measure of success can be obtained by employing sodium nitrate in place of sodium chlorid in the practice of my process, in which case crystals of sodium sulfate are obtained. I have also found that an approximately concentrated solution of sodium chlorid can be employed in place of the sodium sulfate solution in the second and third tanks and that for such use a concentrated solution of sodium chlorid is to be regarded as the chemical equivalent of the sodium sulfate solution hereinbefore referred to. Where a solution of sodium chlorid is employed in the second and third tanks, substantially pure sodium sulfate crystals will be obtained.

While I have described in detail the preferred practice of my process and the proportions in which I prefer to mix my ingredients it is to be understood that the proportions may be widely varied within the spirit of my invention and that chemical equivalents as hereinbefore referred to may be resorted to.

Having thus described my invention, I claim:—

1. The herein described process which consists in adding sodium chlorid to a solution of sodium sulfate and potassium sulfate, crystallizing a portion of the salt in solution, and separating the crystals from the mother liquor.

2. The herein described process which consists in adding sodium chlorid to a solution of sodium sulfate and potassium sulfate, heating the solution until crystals form therein, and separating the crystals from the mother liquor.

3. The herein described process which consists in adding sodium chlorid to a substantially saturated solution of sodium sulfate and potassium sulfate, maintaining the solution at an elevated temperature and withdrawing sodium sulfate crystals therefrom.

4. The herein described process which consists in adding sodium chlorid to a substantially saturated solution of sodium sulfate and potassium sulfate, crystallizing a portion of the salt in solution, withdrawing the crystals formed into a substantially saturated solution of sodium sulfate and separating the crystals therefrom.

5. The herein described process which consists in adding sodium chlorid to a substantially saturated solution of sodium sulfate and potassium sulfate, maintaining the solution at a temperature of from 60° C. to 107° C., withdrawing the sodium salt crystals formed therein into a substantially saturated solution of sodium sulfate, maintaining the last named solution at approximately from 60° C. to 107° C. and withdrawing the crystals from the last named solution.

In testimony whereof I affix my signature in presence of two witnesses.

HARRY P. BASSETT.

Witnesses:
JAMES K. P. WILKINSON,
ALLAN HERBERT FISHER.

---

Copies of this patent may be obtained for five cents each, by addressing the "Commissioner of Patents, Washington, D. C."